(12) United States Patent
Feng et al.

(10) Patent No.: US 10,357,691 B2
(45) Date of Patent: Jul. 23, 2019

(54) BALL STRUCTURE AND METHOD FOR MAKING THE SAME

(71) Applicant: SAN FANG CHEMICAL INDUSTRY CO., LTD., Kaohsiung (TW)

(72) Inventors: Chung-Chih Feng, Kaohsiung (TW); Chun-Wei Wu, Kaohsiung (TW); Yong-Song Lin, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 16/149,528

(22) Filed: Oct. 2, 2018

(65) Prior Publication Data
US 2019/0160345 A1    May 30, 2019

(30) Foreign Application Priority Data
Nov. 27, 2017  (TW) .............................. 106141088 A (51) Int. Cl.
| A63B 41/08 | (2006.01) |
| A63B 45/00 | (2006.01) |
| A63B 41/02 | (2006.01) |
| B29D 22/02 | (2006.01) |

(52) U.S. Cl.
CPC .............. *A63B 41/08* (2013.01); *A63B 41/02* (2013.01); *A63B 45/00* (2013.01); *B29D 22/02* (2013.01); *A63B 2243/0025* (2013.01)

(58) Field of Classification Search
CPC ......... A63B 41/08; A63B 41/10; A63B 41/02; A63B 45/00; A63B 2243/0025; B29D 22/02
See application file for complete search history.

(56) References Cited

U.S. PATENT DOCUMENTS

| 6,206,795 B1* | 3/2001 | Ou .......................... A63B 41/08 473/599 |
| 7,759,423 B2* | 7/2010 | Chauk .................... C08F 283/06 252/182.24 |
| 2003/0140794 A1* | 7/2003 | Wang .................. B01D 39/1676 96/226 |

(Continued)

FOREIGN PATENT DOCUMENTS

| CN | 1843531 A | 10/2016 |
| TW | 201134660 A | 10/2011 |

OTHER PUBLICATIONS

English Abstract Translation of CN 1843531 A.
(Continued)

*Primary Examiner* — Steven B Wong
(74) *Attorney, Agent, or Firm* — WPAT, P.C., Intellectual Property Attorneys; Anthony King (57) ABSTRACT

The present invention relates to a ball structure and method for making the same. The ball structure includes an inner bladder and a plurality of covers. The covers surround the inner bladder. Each of the covers includes a base fabric layer, a middle layer and a surface layer. The middle layer is formed from a first polyurethane (PU) solution. A PU solid content of the first PU solution is greater than 70 wt %. The middle layer is a foamed layer, and a porosity thereof is 25% to 85%. The surface layer is formed from a second polyurethane (PU) solution. A PU solid content of the second PU solution is 5 wt % to 20 wt %.

10 Claims, 12 Drawing Sheets

(56) References Cited

U.S. PATENT DOCUMENTS

| | | | | |
|---|---|---|---|---|
| 2006/0046880 A1* | 3/2006 | Tang | ............... | A63B 41/08 473/604 |
| 2009/0186724 A1* | 7/2009 | Ashida | ............... | A63B 41/08 473/607 |
| 2012/0088614 A1* | 4/2012 | Bulfin | ............... | A63B 41/08 473/604 |
| 2012/0142465 A1* | 6/2012 | Berggren | ............... | A63B 41/08 473/604 |
| 2013/0005521 A1* | 1/2013 | White | ............... | A63B 41/085 473/604 |
| 2014/0179469 A1* | 6/2014 | Berggren | ............... | A63B 45/00 473/604 |
| 2015/0190682 A1 | 7/2015 | Hussain | | |
| 2017/0072270 A1* | 3/2017 | Shishido | ............... | A63B 41/08 |
| 2017/0259126 A1 | 9/2017 | Butt et al. | | |
| 2018/0296881 A1* | 10/2018 | Masood | ............... | A63B 41/08 |

OTHER PUBLICATIONS

English Abstract Translation of TW 201134660 A.
English Translation of Search Report dated May 23, 2018 issued by Taiwan Intellectual Property Office for TW counterpart application 106141088.
Office Action dated Jun. 19, 2018 and Search Report dated May 23, 2018 issued by Taiwan Intellectual Property Office for counterpart application 106141088.

* cited by examiner

BALL STRUCTURE AND METHOD FOR MAKING THE SAME

BACKGROUND OF THE INVENTION

1. Field of the Invention

The present invention relates to a ball structure and method for making the same, and more particularly to a ball structure without a cover adhered by an ethylene-vinyl acetate copolymer (EVA), and a method for making the same.

2. Description of the Related Art

Figure 1:
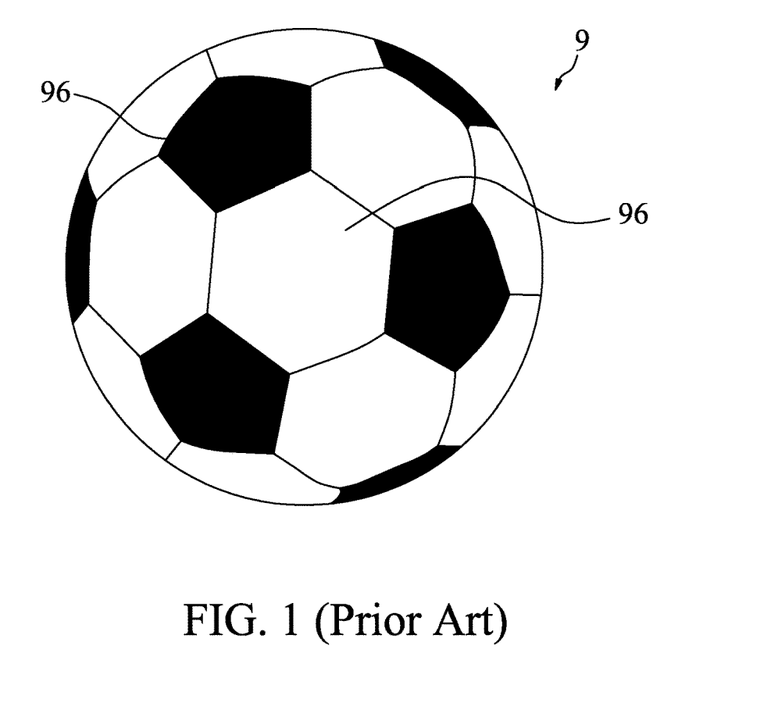
FIG. 1 illustrates a schematic perspective view of a conventional football (or soccer).
Figure 2:
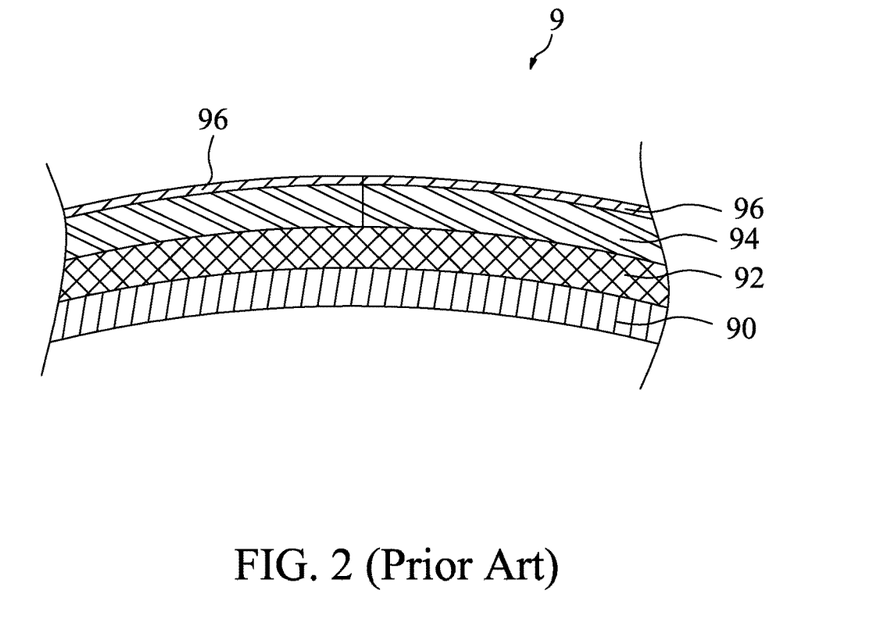
FIG. 2 illustrates a schematic partially cross-sectional view of the conventional football (or soccer) of FIG. 1.

Referring to FIG. 1, FIG. 1 illustrates a schematic perspective view of a conventional football (or soccer) 9. Referring to FIG. 2, FIG. 2 illustrates a schematic partially cross-sectional view of the conventional football (or soccer) 9 of FIG. 1. The conventional football (or soccer) 9 includes an inner bladder 90, a middle bladder 92, an ethylene-vinyl acetate copolymer (EVA) layer 94 and a plurality of covers 96. The inner bladder 90 may be inflated to form a ball shape structure, and the material of the inner bladder 90 is generally rubber. The middle bladder 92 coats or covers the inner bladder 90. The material of the middle bladder 92 is generally canvas, and the canvas is cut into a plurality of pentagonal sheet materials, and then the plurality of pentagonal sheet materials are sewn together to form a ball. The EVA layer 94 is attached or adhered to the middle bladder 92. Materials of the covers 96 are generally genuine leather (or natural leather), rubber or synthetic leather (or artificial leather), and there are generally twenty four pieces of covers 96. The covers 96 are attached or adhered to the middle bladder 92.

Figure 3:
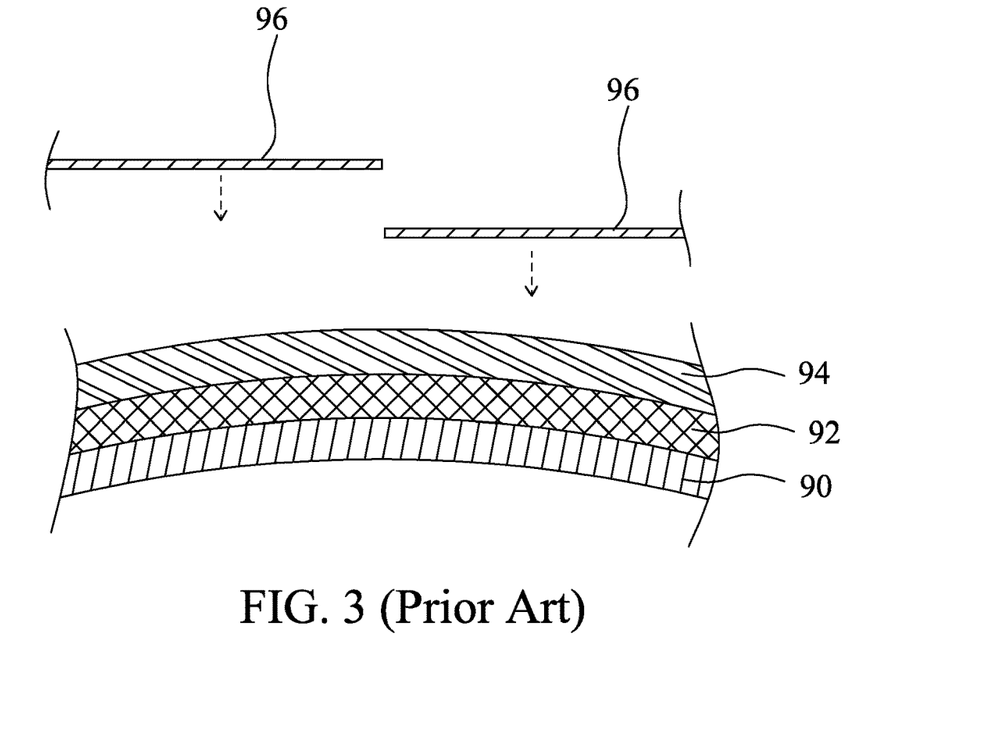
FIG. 3 illustrates a schematic view of a method for making a conventional football (or soccer).

Referring to FIG. 3, FIG. 3 illustrates a schematic view of a method for making a conventional football 9. The method for making a conventional football 9 is described as follows. First, a canvas material used for the middle bladder 92 is cut into a plurality of pentagonal sheet materials, and then the plurality of pentagonal sheet materials is sewn to form a ball. Next, the inner bladder 90 is placed inside the middle bladder 92. Then, the EVA layer 94 is formed on a surface of the middle bladder 92. Finally, the covers 96 are attached or adhered to the EVA layer 94, to obtain the conventional football 9 shown in FIG. 1 and FIG. 2.

In the method for making the conventional football 9, the canvas used for the middle bladder 92 needs to be cut manually. Consequently, the method has disadvantages such as a long processing time, high labor costs, relatively low production efficiency, and poor product stability. In addition, the EVA layer 94 is not environmentally friendly and is easy to cause environmental pollution.

Therefore, it is necessary to provide an innovative and progressive ball structure and a method for making the same, to resolve the foregoing problems.

SUMMARY OF THE INVENTION

The present invention provides a ball structure, which includes an inner bladder and a plurality of covers. The covers surround the inner bladder. Each of the covers includes a base fabric layer, a middle layer and a surface layer. The base fabric layer has a thickness of approximately 0.5 mm to 3 mm. The middle layer is formed from a first polyurethane (PU) solution. A PU solid content of the first PU solution is greater than 70 wt %, and a thickness of the middle layer is approximately 2 mm to 5 mm. The middle layer is a foamed layer, and a porosity thereof is 25% to 85%. The surface layer is formed from a second polyurethane (PU) solution. A PU solid content of the second PU solution is 5 wt % to 20 wt %. The middle layer is located between the surface layer and the base fabric layer. A thickness of the surface layer is approximately 0.02 mm to 0.2 mm.

The present invention further provides a method for making a ball structure, comprising: (a) providing an inner bladder and a middle bladder, wherein the middle bladder covers the inner bladder; (b) providing a plurality of covers, wherein each of the covers includes a base fabric layer, a middle layer and a surface layer, the base fabric layer has a thickness of approximately 0.5 mm to 3 mm, the middle layer is formed from a first polyurethane (PU) solution, a PU solid content of the first PU solution is greater than 70 wt %, a thickness of the middle layer is approximately 2 mm to 5 mm, the middle layer is a foamed layer, and a porosity thereof is 25% to 85%, the surface layer is formed from a second polyurethane (PU) solution, a PU solid content of the second PU solution is 5 wt % to 20 wt %, the middle layer is located between the surface layer and the base fabric layer, and a thickness of the surface layer is approximately 0.02 mm to 0.2 mm; and (c) attaching the base fabric layers of the covers to the middle bladder.

The present invention further provides a method for making a ball structure, comprising: (a) providing a plurality of covers, wherein each of the covers includes a base fabric layer, a middle layer and a surface layer, the base fabric layer has a thickness of approximately 0.5 mm to 3 mm, the middle layer is formed from a first polyurethane (PU) solution, a PU solid content of the first PU solution is greater than 70 wt %, a thickness of the middle layer is approximately 2 mm to 5 mm, the middle layer is a foamed layer, and a porosity thereof is 25% to 85%, the surface layer is formed from a second polyurethane (PU) solution, a PU solid content of the second PU solution is 5 wt % to 20 wt %, the middle layer is located between the surface layer and the base fabric layer, and a thickness of the surface layer is approximately 0.02 mm to 0.2 mm, wherein the surface layer includes a first surface that is far away from the base fabric layer; (b) attaching the first surfaces of the surface layers of adjacent covers to each other at a peripheral edge of the covers to form an outer skin structure; (c) reversing the outer skin structure from the inside to the outside, so that the first surface of the surface layer faces outward, wherein the outer skin structure substantially forms a ball shape structure, and includes a notch; (d) placing an inner bladder in the outer skin structure through the notch; and (e) attaching at least one cover to the inner bladder that is exposed by the notch.

BRIEF DESCRIPTION OF THE DRAWINGS

The invention will be described according to the appended drawings, in which.

PREFERRED EMBODIMENT OF THE PRESENT INVENTION

Figure 4:
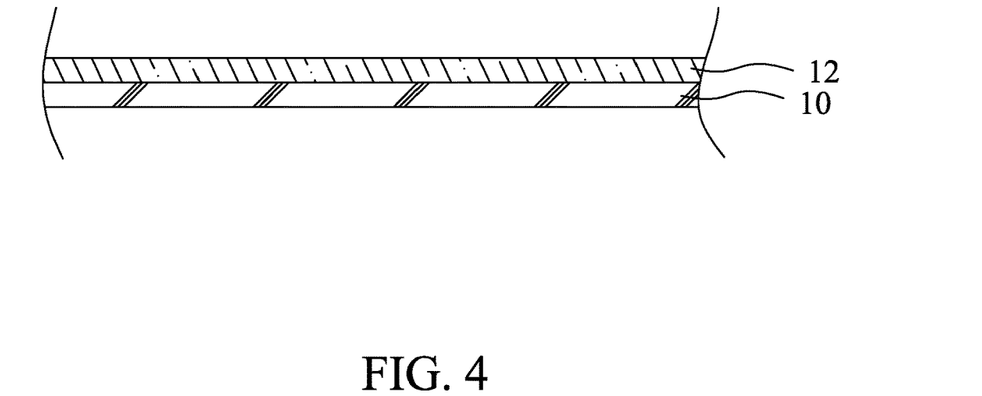
FIG. 4 to FIG. 7 illustrate one or more stages of an example of a method for making a laminated material according to some embodiments of the present invention.

Referring to FIG. 4 to FIG. 7, FIG. 4 to FIG. 7 illustrate one or more stages of an example of a method for making a laminated material 1 according to some embodiments of the present invention. Referring to FIG. 4, a second polyurethane (PU) solution is formed on a release paper 10 by means of coating, and a viscosity of the second PU solution at 30° C. is 1200 cps to 1800 cps. A PU solid content of the second PU solution is 5 wt % to 20 wt %, and is preferably 10 wt % to 15 wt %. Then, the second PU solution is dried for two minutes at a temperature of 100° C. to 120° C., to form a surface layer 12. In this embodiment, the thickness of the surface layer 12 is approximately 0.02 mm to 0.2 mm.

Figure 5:
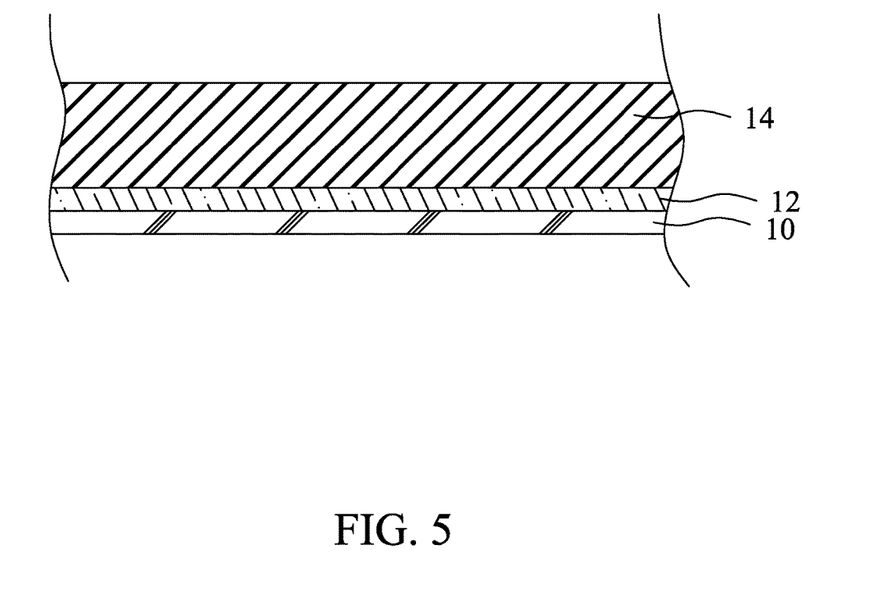

Referring to FIG. 5, a first PU solution is formed on the surface layer 12 by means of coating, and a viscosity of the first PU solution at 30° C. is 10000 cps to 30000 cps. A PU solid content of the first PU solution is greater than 70 wt %, and is preferably over 80 wt %. In an embodiment, the first PU solution may further include an interface agent (or a surfactant), a hardening agent, a foaming agent and a coloring agent (including e.g., colorants (or dyes) or pigments). In this embodiment, the first PU solution includes 83 wt % PU resins, 0.5 wt % to 1 wt % interface agents, 4 wt % to 6 wt % hardening agents, 2 wt % to 5 wt % foaming agents and 2 wt % to 5 wt % coloring agents. In addition, before being coated on the surface layer 12, the first PU solution may be stirred and subject to vacuum degassing to remove air during stirring. Then, the first PU solution is coated on the surface layer 12. Next, the first PU solution is dried for two and a half minutes to three minutes at a temperature of 150° C. to 170° C., to form a middle layer 14. In this embodiment, the middle layer 14 is a foamed layer, a porosity thereof is 25% to 85%, and is preferably 50% to 60%, and a hardness (ASK C) thereof is 25 to 50. The thickness of the middle layer 14 is approximately 2 mm to 5 mm, and is preferably 3 mm to 5 mm.

Figure 6:
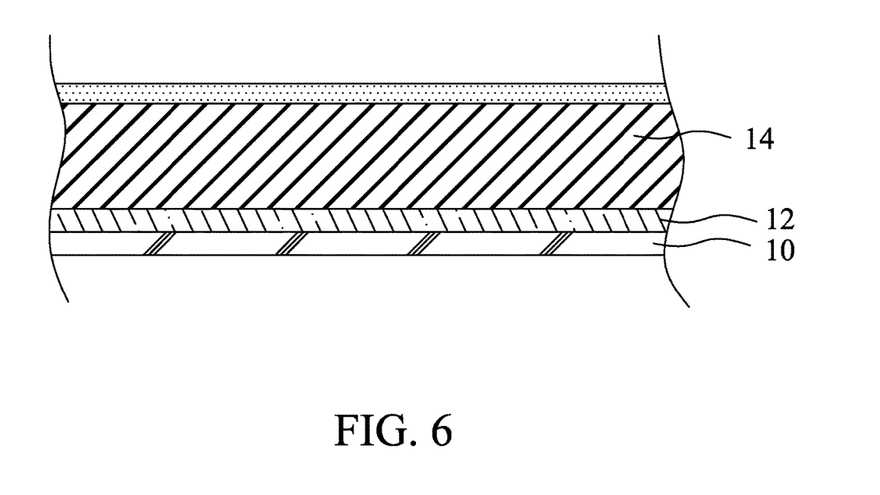

Referring to FIG. 6, an adhesive layer solution is formed on the middle layer 14 by means of coating. In this embodiment, the material of the adhesive layer solution is a PU solution, and a PU solid content thereof is approximately 50 wt %.

Figure 7:
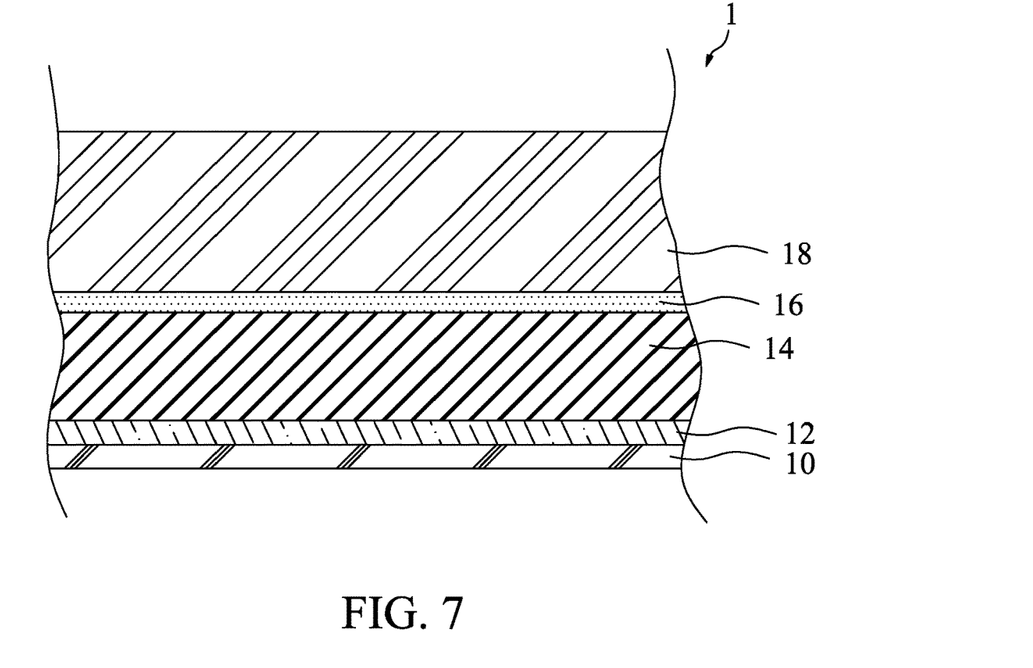

Referring to FIG. 7, a base fabric layer 18 is laminated and adhered to the adhesive layer solution. The base fabric layer 18 is a fabric such as a woven fabric, a microfiber fabric or a nonwoven fabric. In this embodiment, the thickness of the base fabric layer 18 is approximately 0.5 mm to 3 mm. Next, the adhesive layer solution is dried at a temperature of 60° C. to 140° C., to form an adhesive layer 16. Then, the release paper 10 is removed, to obtain the laminated material 1.

Figure 8:
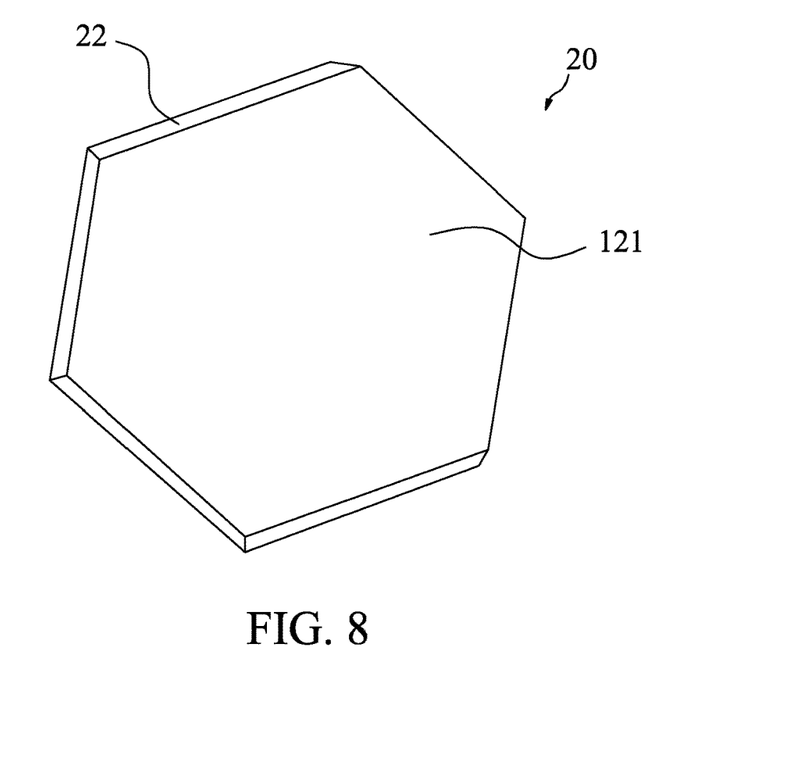
FIG. 8 illustrates a schematic perspective view of an embodiment of a cover according to the present invention.
Figure 9:
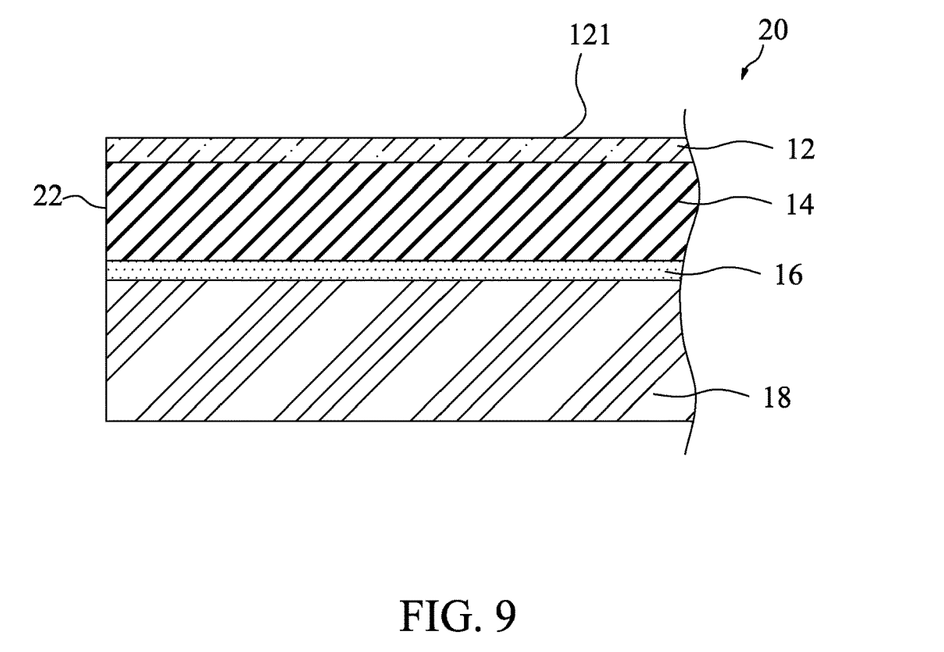
FIG. 9 illustrates a schematic partially cross-sectional view of the cover of FIG. 8.

Referring to FIG. 8, FIG. 8 illustrates a schematic perspective view of an embodiment of a cover 20 according to the present invention. Referring to FIG. 9, FIG. 9 illustrates a schematic partially cross-sectional view of the cover 20 of FIG. 8. The cover 20 is cut from the laminated material 1 (FIG. 7), and is used as an outermost layer of a ball structure. The cover 20 includes the base fabric layer 18, the adhesive layer 16, the middle layer 14 and the surface layer 12. The middle layer 14 is adhered to the base fabric layer 18 through the adhesive layer 16. The middle layer 14 is located between the surface layer 12 and the base fabric layer 18. The surface layer 12 includes a first surface 121. The first surface 121 is an upper surface of the cover 20, and is far away from the base fabric layer 18. The cover 20 includes a side surface 22.

Figure 10:
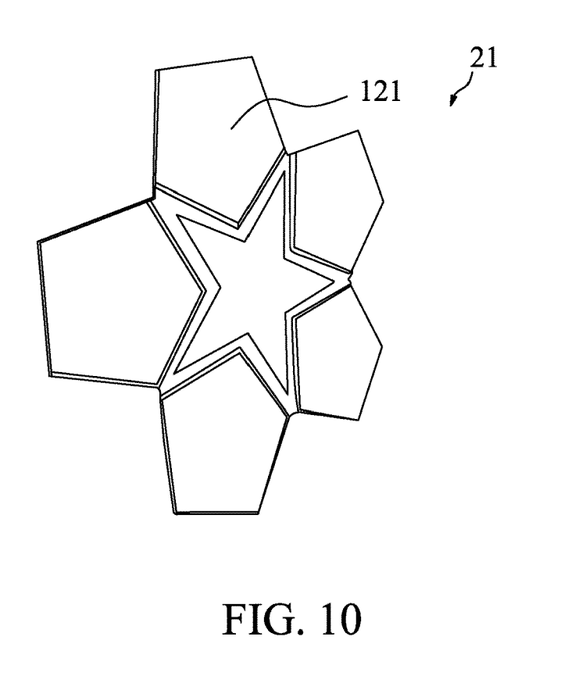
FIG. 10 illustrates a perspective view of an embodiment of a cover according to the present invention.

Referring to FIG. 10, FIG. 10 illustrates a perspective view of an embodiment of a cover 21 according to the present invention. In this embodiment, the upper surface of the cover 20 is pressurized by using radiofrequency (or high frequency) or in another way, so that the first surface 121 of the surface layer 12 has a recessed pattern.

Figure 11:
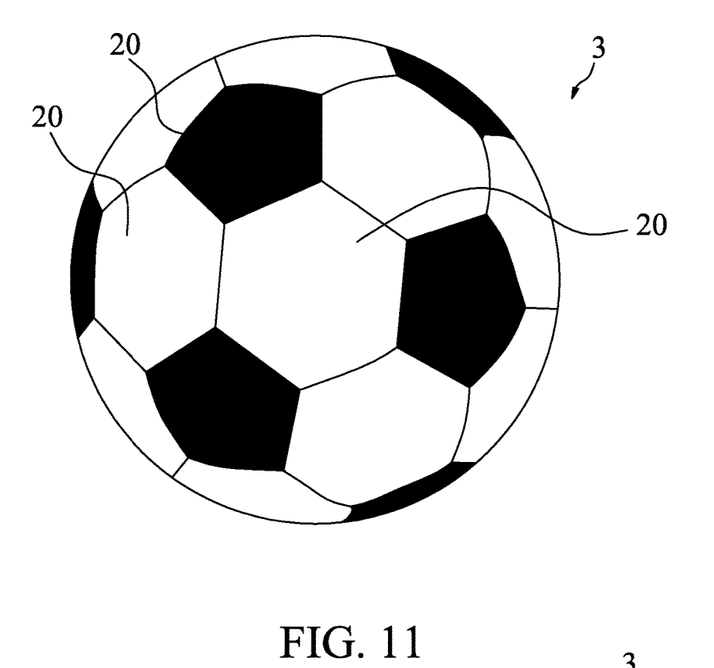
FIG. 11 illustrates a schematic perspective view of an embodiment of a ball structure according to the present invention.
Figure 12:
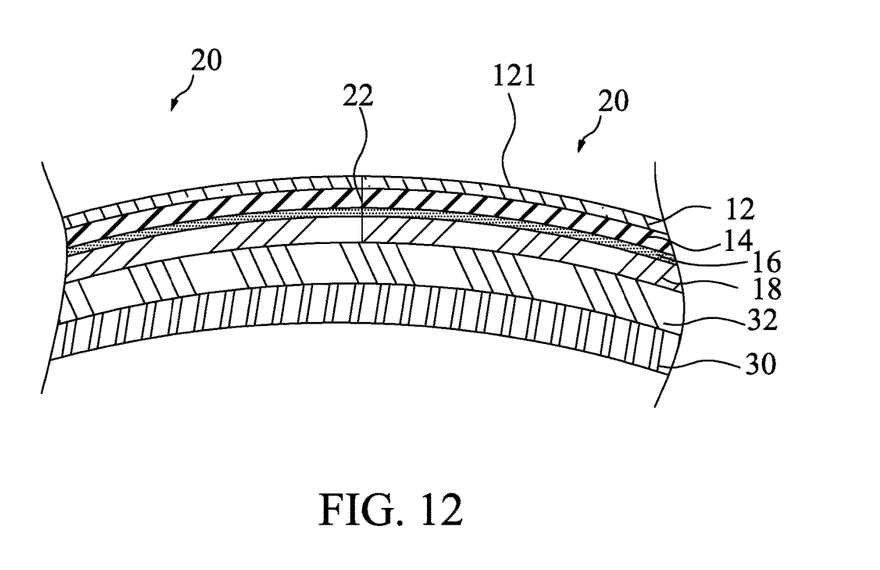
FIG. 12 illustrates a schematic partially cross-sectional view of the ball structure of FIG. 11.

Referring to FIG. 11, FIG. 11 illustrates a schematic perspective view of an embodiment of a ball structure 3 according to the present invention. Referring to FIG. 12, FIG. 12 illustrates a schematic partially cross-sectional view of the ball structure 3 of FIG. 11. In this embodiment, the ball structure 3 is a football (or soccer). The ball structure 3 includes an inner bladder 30, a middle bladder 32 and a plurality of covers 20. The inner bladder 30 may be inflated to form a ball shape structure, and the material of the inner bladder 30 may be rubber. The middle bladder 32 coats or covers the inner bladder 30. The material of the middle bladder 32 may be rubber or canvas. The covers 20 are the covers 20 shown in FIG. 8, FIG. 9 or FIG. 10, and there are generally eight pieces, sixteen pieces, or twenty four pieces of covers 20. The base fabric layers 18 of the covers 20 are attached or adhered to the middle bladder 32. That is, the covers 20 surround the inner bladder 30.

Preferably, side surfaces 22 of adjacent covers 20 face each other or are connected or bonded to each other. It should be noted that in the aforementioned method for making the ball structure 3, an EVA layer does not need to be formed. Therefore, it is relatively environmentally friendly and is not readily to cause environmental pollution.

Figure 13:
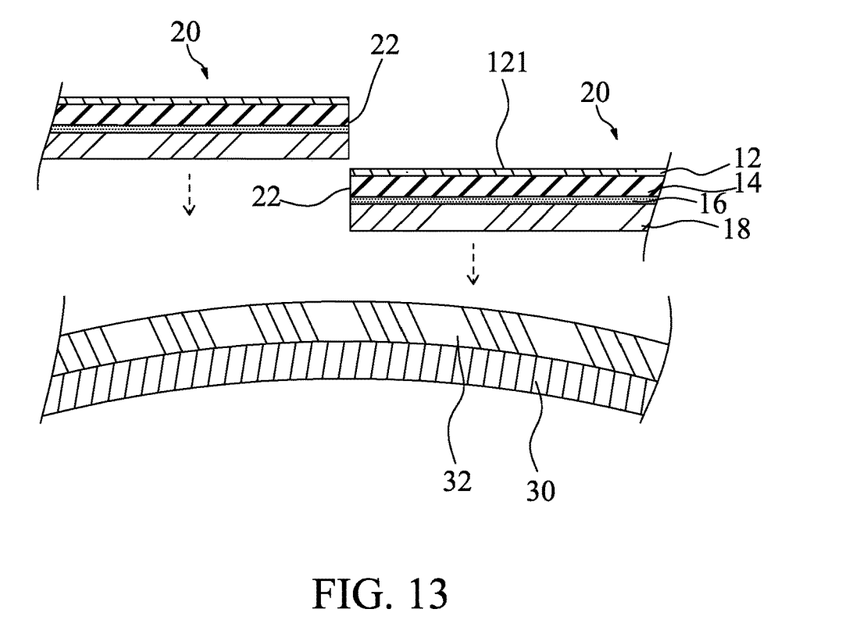
FIG. 13 illustrates one or more stages of an example of a method for making a ball structure according to some embodiments of the present invention.

Referring to FIG. 13, FIG. 13 illustrates one or more stages of an example of a method for making a ball structure 3 according to some embodiments of the present invention. The method for making the ball structure 3 is described as follows. First, the inner bladder 30 and the middle bladder 32 are provided, and the middle bladder 32 coats or covers the inner bladder 30. In this embodiment, the material of the middle bladder 32 is canvas, and the canvas is cut into a plurality of pentagonal sheet materials, and then the plurality of pentagonal sheet materials are sewn to form a ball shape. Next, the inner bladder 30 is stuffed into in the middle bladder 32. In another embodiment, after the inner bladder 30 is placed in a mold (not shown), the middle bladder 32 (the material of the middle bladder 32 is rubber) is formed on an outer surface of the inner bladder 30.

Next, the covers 20 are provided, and the covers 20 are the covers 20 shown in FIG. 8, FIG. 9 or FIG. 10. Then, the base fabric layers 18 of the covers 20 are attached (or adhered) or connected to the middle bladder 32 by using radiofrequency (or high frequency) or in another way, to make the ball structure 3 of FIG. 11 and FIG. 12.

In this embodiment, the covers 20 are directly attached (or adhered) or laminated (or pressed) to the middle bladder 32, and the EVA layer does not need to be formed. Therefore, a processing time and manufacturing cost can be reduced and it is relatively environmentally friendly. In addition, the method for making the ball structure 3 has advantages such as a short processing time, low labor costs, relatively high production efficiency, and good product stability.

Figure 14:
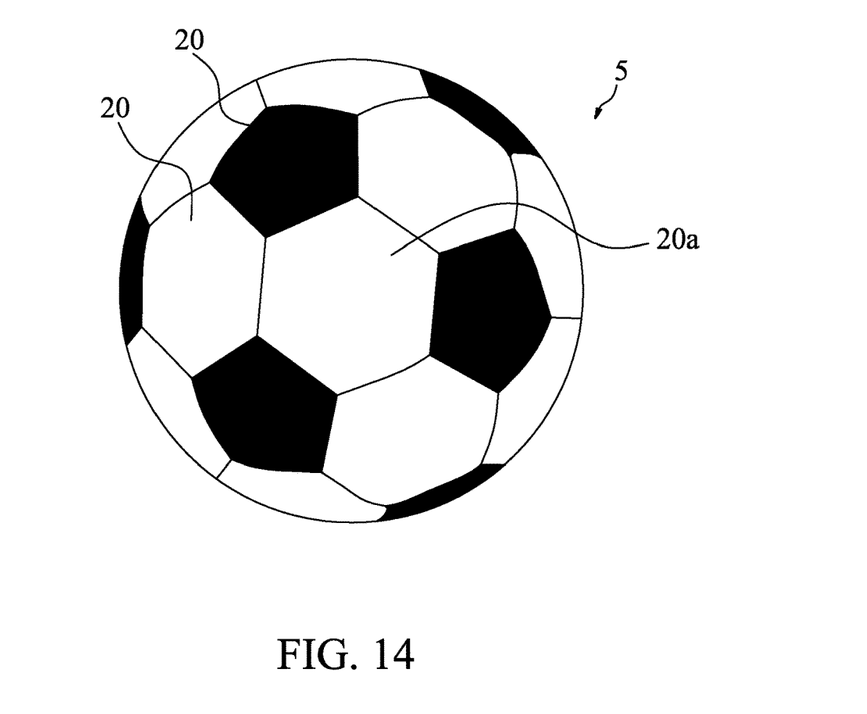
FIG. 14 illustrates a schematic perspective view of an embodiment of a ball structure according to the present invention.
Figure 15:
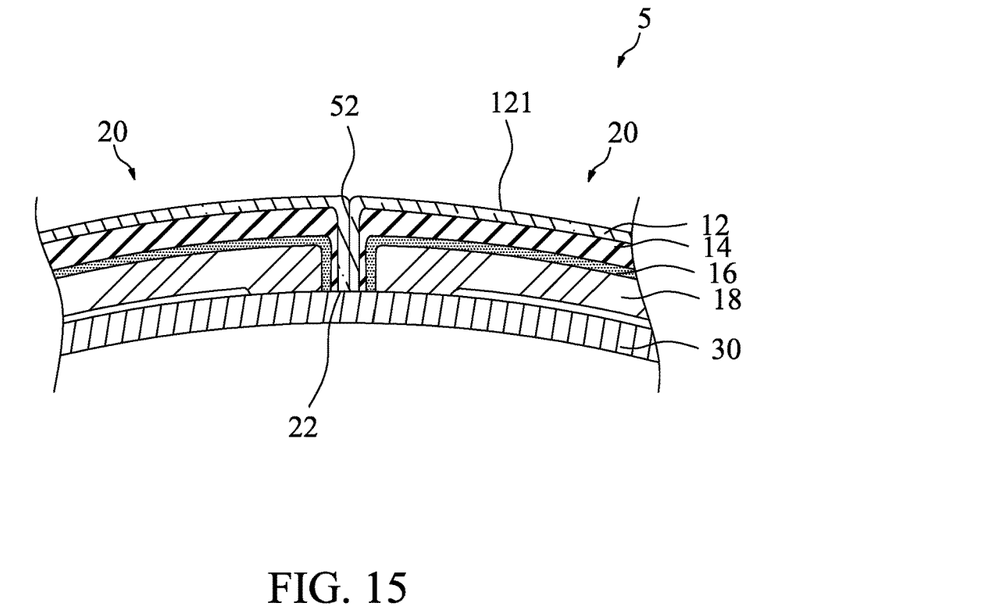
FIG. 15 illustrates a schematic partially cross-sectional view of a first part of the ball structure of FIG. 14.
Figure 16:
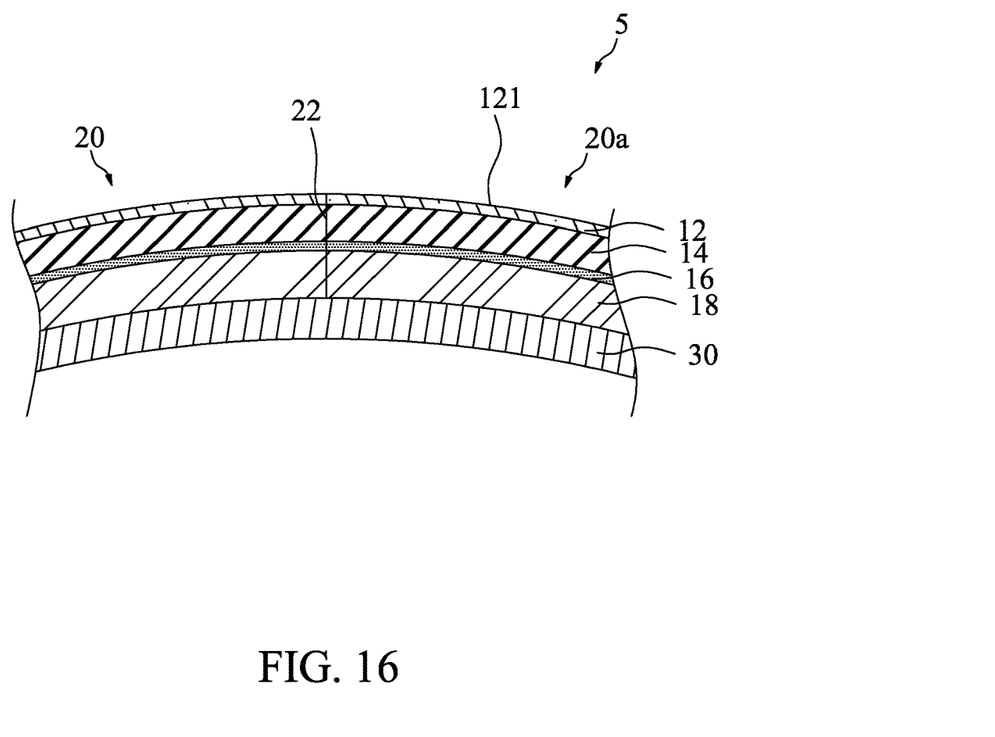
FIG. 16 illustrates a schematic partially cross-sectional view of a second part of the ball structure of FIG. 14.

Referring to FIG. 14, FIG. 14 illustrates a schematic perspective view of an embodiment of a ball structure 5 according to the present invention. Referring to FIG. 15, FIG. 15 illustrates a schematic partially cross-sectional view of a first part of the ball structure 5 of FIG. 14. Referring to FIG. 16, FIG. 16 illustrates a schematic partially cross-sectional view of a second part of the ball structure 5 of FIG. 14. In this embodiment, the ball structure 5 is a football (or soccer). The ball structure 5 includes an inner bladder 30 and a plurality of covers 20. The inner bladder 30 may be inflated to form a ball shape structure, and the material of the inner bladder 30 may be rubber. The covers 20 surround the inner bladder 30. First surfaces 121 of the surface layers 12 of adjacent covers 20 are connected (or bonded) to each other at a peripheral edge of the covers 20 to form a joint interface 52, and the joint interface 52 is substantially perpendicular to an outer surface of the inner bladder 30. That is, in this embodiment, the middle bladder 32 may be omitted. In this embodiment, the lower surfaces of the covers 20 may be not connected or adhered to the inner bladder 30. That is, there may be a gap between the base fabric layers 18 of the covers 20 and the outer surface of the inner bladder 30.

As shown in FIG. 16, the ball structure 5 further includes at least one cover 20a, and a structure of the cover 20a is the same as structures of the covers 20. However, the cover 20a is directly adhered or attached to the inner bladder 30 (the cover 20a may be considered as a sealing cover). That is, the cover 20a and the covers 20 do not form the joint interface 52, and a side surface of the cover 20a faces or is in contact with side surfaces 22 of the covers 20.

It should be noted that in a process of making the ball structure 5, the EVA layer does not need to be formed. Therefore, a processing time and manufacturing cost can be reduced and it is relatively environmentally friendly.

Figure 17:
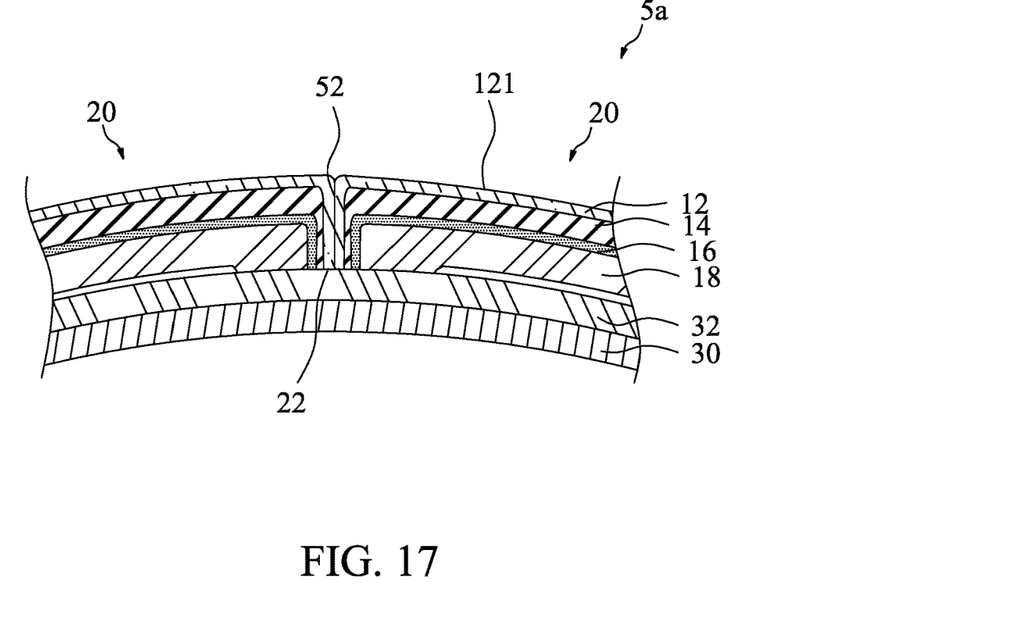
FIG. 17 illustrates a schematic partially cross-sectional view of a first part of an embodiment of a ball structure according to the present invention.
Figure 18:
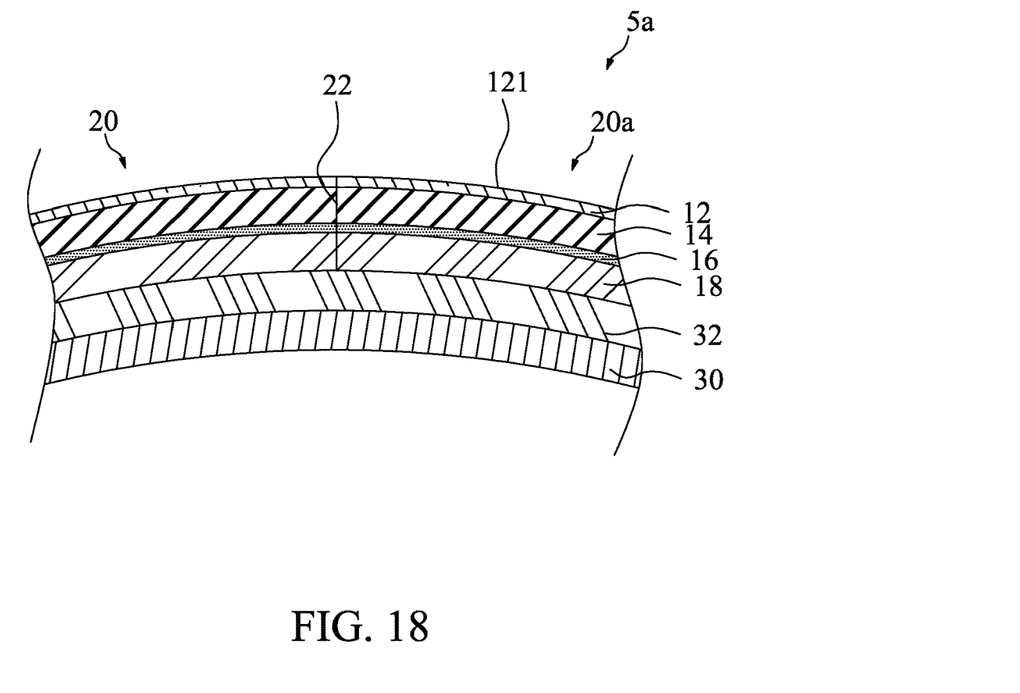
FIG. 18 illustrates a schematic partially cross-sectional view of a second part of the ball structure of FIG. 17.
Figure 19:
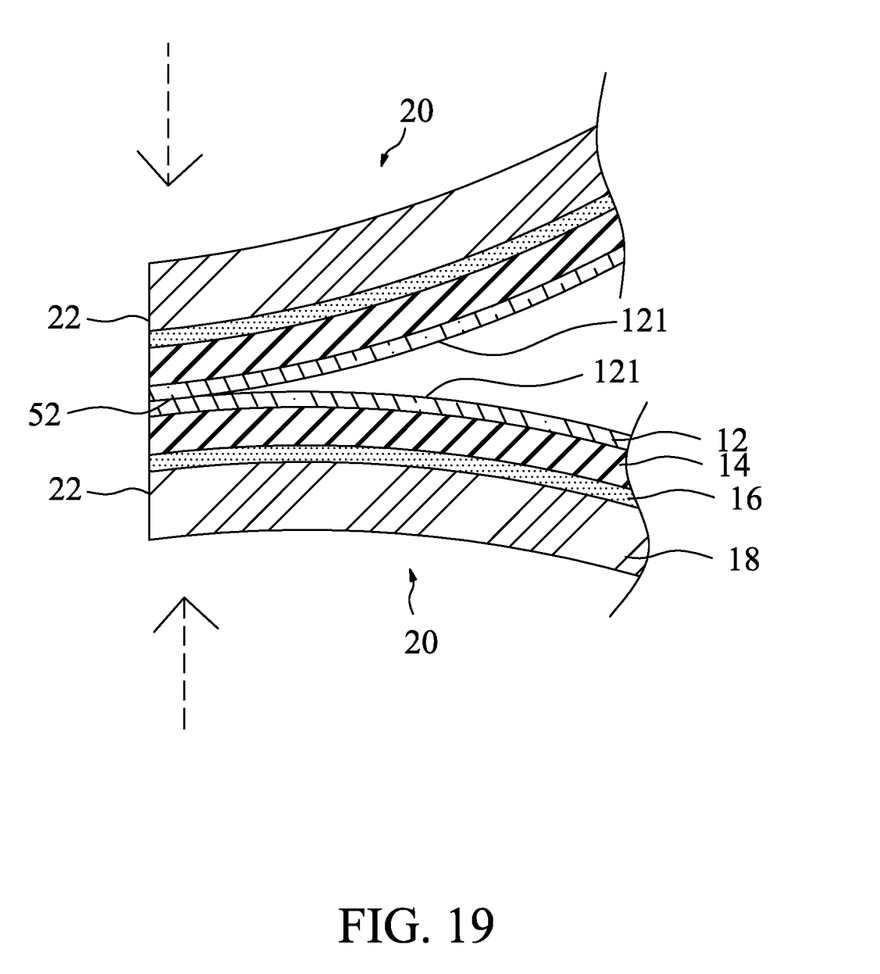
FIG. 19 to FIG. 22 illustrate one or more stages of an example of a method for making a ball structure according to some embodiments of the present invention.

Referring to FIG. 17, FIG. 17 illustrates a schematic partially cross-sectional view of a first part of an embodiment of a ball structure 5a according to the present invention. Referring to FIG. 18, FIG. 18 illustrates a schematic partially cross-sectional view of a second part of the ball structure 5a of FIG. 17. The ball structure 5a in this embodiment is substantially the same as the ball structure 5 of FIG. 14 to FIG. 16. A difference only lies in that the ball structure 5a in this embodiment further includes the middle bladder 32 that is located between the inner bladder 30 and the covers 20 and 20a. Therefore, the covers 20 surround the middle bladder 32. In addition, as shown in FIG. 18, the cover 20a is directly adhered or attached to the middle bladder 32.

Referring to FIG. 19 to FIG. 22, FIG. 19 to FIG. 22 illustrate one or more stages of an example of a method for making a ball structure 5 according to some embodiments of the present invention. The method for making the ball structure 5 is described as follows. First, referring to FIG. 19, the plurality of covers 20 are provided. The covers 20 are the covers 20 shown in FIG. 8, FIG. 9 or FIG. 10, and each cover 20 includes a base fabric layer 18, an adhesive layer 16, a middle layer 14 and a surface layer 12. The middle layer 14 is adhered to the base fabric layer 18 through the adhesive layer 16. The middle layer 14 is located between the surface layer 12 and the base fabric layer 18. The surface layer 12 has a first surface 121. The first surface 121 is an upper surface of the cover 20, and is far away from the base fabric layer 18. The cover 20 has a side surface 22. Next, two covers 20 are arranged in such a manner that the first surface 121 faces the first surface 121. Then, parts of the first surfaces 121 of the surface layers 12 at peripheral edges of two adjacent covers 20 are connected, bonded or attached together (for example, by using radiofrequency (or high frequency)), to form a joint interface 52.

Figure 20:
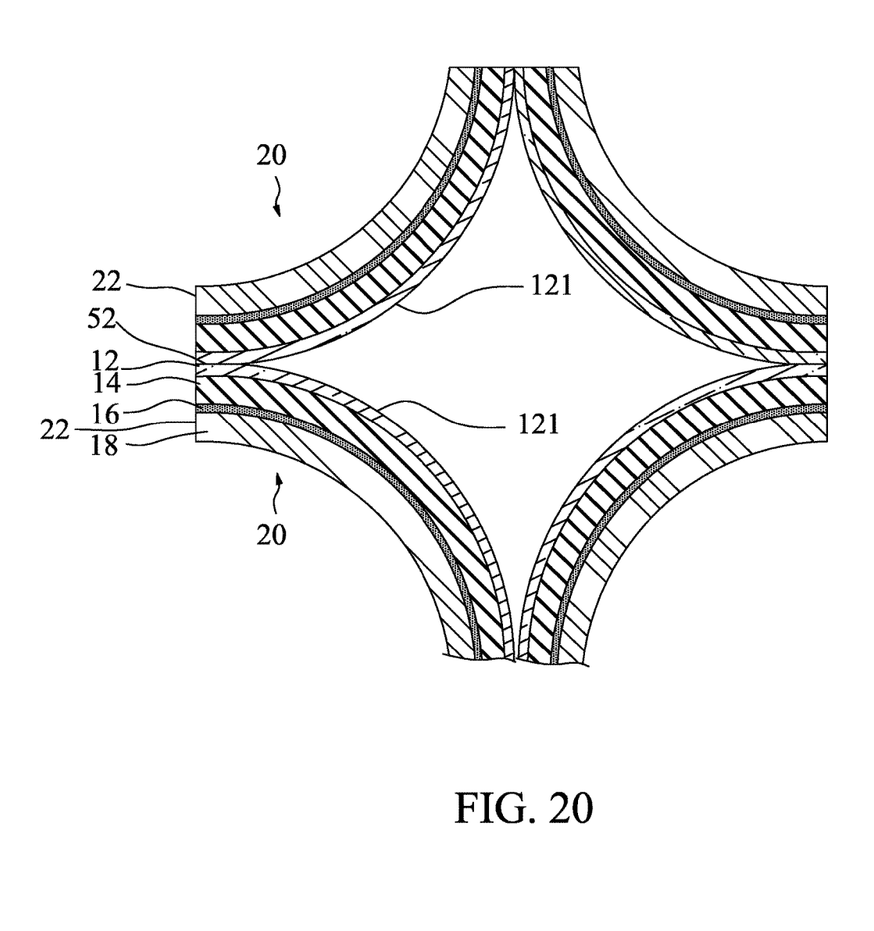

Referring to FIG. 20, another plurality of adjacent covers 20 that are planned in advance are connected or bonded together in the same manner, to form an outer skin structure 6. Meanwhile, the first surface 121 of the surface layer 12 is located inside the outer skin structure 6, and the base fabric layer 18 is located outside the outer skin structure 6.

Figure 21:
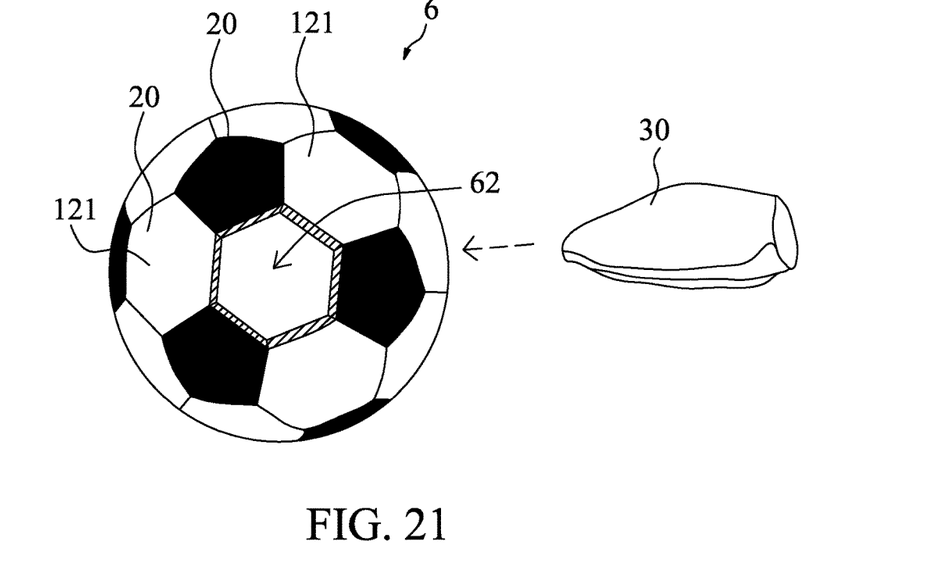
Figure 22:
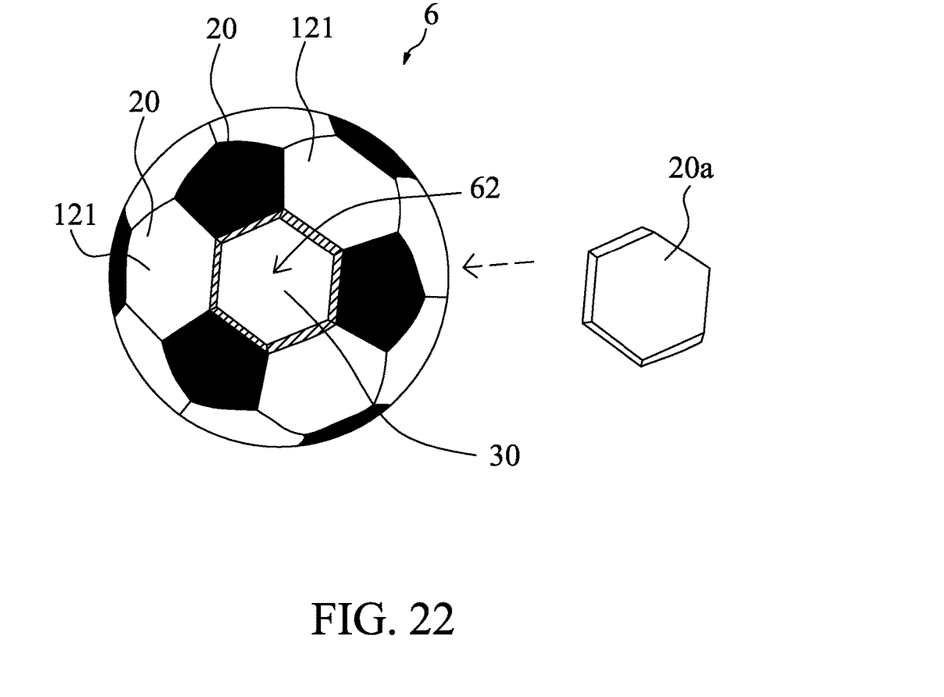

Referring to FIG. 21, the outer skin structure 6 is reversed (or turned) from the inside to the outside, so that the first surface 121 of the surface layer 12 faces outward, and the base fabric layer 18 is located inside the outer skin structure 6. Meanwhile, the outer skin structure 6 substantially forms a ball shape structure, and includes a notch 62. The size of the notch 62 is substantially the same as that of the at least one cover 20a (FIG. 22). Next, the inner bladder 30 that is not inflated is placed in the outer skin structure 6 through the notch 62.

Referring to FIG. 22, after the inner bladder 30 is inflated, the at least one cover 20a is adhered (for example, attached) to the inner bladder 30 that is exposed by the notch 62, to make the ball structure 5 shown in FIG. 14 to FIG. 16. In another embodiment, the inner bladder 30 placed in FIG. 21 is further coated or covered by a middle bladder 32, and in FIG. 22, the at least one cover 20a is adhered to the middle bladder 32 that is exposed by the notch 62, to make the ball structure 5a shown in FIG. 17 and FIG. 18.

In this embodiment, the covers 20 are directly connected to each other to form the outer skin structure 6, and the EVA layer does not need to be formed. Therefore, a processing time and manufacturing cost can be reduced and it is relatively environmentally friendly. In addition, the methods for making the ball structures 5 and 5a have advantages such as a short processing time, low labor costs, relatively high production efficiency, and good product stability.

The above embodiments are merely for the purpose of describing the principles and effects of the present invention, but are not intended to limit the present invention. Modifications and variations can be made by a person of ordinary skill in the art of the present invention to the above embodiments without departing from the spirit of the present invention. The scope of the present invention is subject to the following claims.

What is claimed is:

1. A ball structure, comprising:
   an inner bladder; and
   a plurality of covers surrounding the inner bladder, wherein each of the covers comprises:
   a base fabric layer having a thickness of approximately 0.5 mm to 3 mm;
   a middle layer formed form a first polyurethane (PU) solution, wherein a PU solid content of the first PU solution is greater than 70 wt %, a thickness of the middle layer is approximately 2 mm to 5 mm, the middle layer is a foamed layer, and a porosity thereof is 25% to 85%; and
   a surface layer formed form a second polyurethane (PU) solution, wherein a PU solid content of the second PU solution is 5 wt % to 20 wt %, the middle layer is located between the surface layer and the base fabric layer, and a thickness of the surface layer is approximately 0.02 mm to 0.2 mm.

2. The ball structure according to claim 1, further comprising a middle bladder, wherein the middle bladder covers the inner bladder, and the base fabric layers of the covers are attached to the middle bladder.

3. The ball structure according to claim 1, wherein the surface layer of the cover includes a first surface that is far away from the base fabric layer, and the first surfaces of the surface layers of adjacent covers are connected to each other at a peripheral edge of the covers.

4. The ball structure according to claim 3, wherein at least one cover is attached to the inner bladder.

5. The ball structure according to claim 1, wherein each of the covers further comprises an adhesive layer, and the middle layer is adhered to the base fabric layer through the adhesive layer.

6. A method for making a ball structure, comprising:
   (a) providing an inner bladder and a middle bladder, wherein the middle bladder covers the inner bladder;
   (b) providing a plurality of covers, wherein each of the covers includes a base fabric layer, a middle layer a surface layer, the base fabric layer has a thickness of approximately 0.5 mm to 3 mm, the middle layer is formed form a first polyurethane (PU) solution, a PU solid content of the first PU solution is greater than 70 wt %, a thickness of the middle layer is approximately 2 mm to 5 mm, the middle layer is a foamed layer, and a porosity thereof is 25% to 85%, the surface layer is formed form a second polyurethane (PU) solution, a PU solid content of the second PU solution is 5 wt % to 20 wt %, the middle layer is located between the surface layer and the base fabric layer, and a thickness of the surface layer is approximately 0.02 mm to 0.2 mm; and
   (c) attaching the base fabric layers of the covers to the middle bladder.

7. The method according to claim 6, wherein in step (b), each of the covers further includes an adhesive layer, and the middle layer is adhered to the base fabric layer through the adhesive layer.

8. A method for making a ball structure, comprising:
   (a) providing a plurality of covers, wherein each of the covers includes a base fabric layer, a middle layer a surface layer, the base fabric layer has a thickness of approximately 0.5 mm to 3 mm, the middle layer is formed form a first polyurethane (PU) solution, a PU solid content of the first PU solution is greater than 70 wt %, a thickness of the middle layer is approximately 2 mm to 5 mm, the middle layer is a foamed layer, and a porosity thereof is 25% to 85%, the surface layer is formed form a second polyurethane (PU) solution, a PU solid content of the second PU solution is 5 wt % to 20 wt %, the middle layer is located between the surface layer and the base fabric layer, and a thickness of the surface layer is approximately 0.02 mm to 0.2 mm, wherein the surface layer includes a first surface that is far away from the base fabric layer;
   (b) attaching the first surfaces of the surface layers of adjacent covers to each other at a peripheral edge of the covers to form an outer skin structure;
   (c) reversing the outer skin structure from the inside to the outside, so that the first surface of the surface layer faces outward, wherein the outer skin structure substantially forms a ball shape structure, and includes a notch;
   (d) placing an inner bladder in the outer skin structure through the notch; and
   (e) attaching at least one cover to the inner bladder that is exposed by the notch.

9. The method according to claim 8, wherein in step (a), each of the covers further includes an adhesive layer, and the middle layer is adhered to the base fabric layer through the adhesive layer.

10. The method according to claim 8, wherein in step (b), parts of the first surfaces of the surface layers at peripheral edges of two adjacent covers are bonded together by using radiofrequency.

* * * * *